United States Patent
Wang

(10) Patent No.: US 10,921,611 B2
(45) Date of Patent: Feb. 16, 2021

(54) METHODS FOR SYSTEM LAYOUT OPTIMIZATION FOR RETRO-REFLECTIVE BASED DISPLAY SYSTEMS

(71) Applicant: MIRRAVIZ, INC., Sunnyvale, CA (US)

(72) Inventor: Michael W. Wang, Sunnyvale, CA (US)

(73) Assignee: MirraViz, Inc., Fremont, CA (US)

(*) Notice: Subject to any disclaimer, the term of this patent is extended or adjusted under 35 U.S.C. 154(b) by 106 days.

(21) Appl. No.: 15/979,388

(22) Filed: May 14, 2018

(65) Prior Publication Data

US 2019/0121150 A1    Apr. 25, 2019

Related U.S. Application Data

(63) Continuation of application No. PCT/US2016/061710, filed on Nov. 11, 2016.

(Continued)

(51) Int. Cl.
*G02B 27/22* (2018.01)
*G02B 27/14* (2006.01)
(Continued)

(52) U.S. Cl.
CPC ............. *G02B 30/36* (2020.01); *G02B 27/14* (2013.01); *G02B 30/35* (2020.01); *G03B 21/28* (2013.01);
(Continued)

(58) Field of Classification Search
CPC ........ G02B 30/36; G02B 30/35; G02B 27/14; H04N 13/363; G03B 21/28; G03B 21/60; G03B 33/10
(Continued)

(56) References Cited

U.S. PATENT DOCUMENTS 3,817,596 A    6/1974 Tanaka
4,439,157 A *  3/1984 Breglia ................. G02B 27/01
                                        359/216.1

(Continued)

FOREIGN PATENT DOCUMENTS

CN         101770156 A    7/2010
WO     WO-2015187433 A1   12/2015
(Continued)

OTHER PUBLICATIONS

PCT/US2016/061710 International Search Report and Written Opinion dated Mar. 17, 2017.
(Continued)

*Primary Examiner* — George G King
(74) *Attorney, Agent, or Firm* — Knobbe, Martens, Olson & Bear, LLP

(57) ABSTRACT

The present disclosure provides a display system that may comprise a retro-reflective screen configured to reflect incident light along a direction that is opposite to the direction of propagation of the incident light, and a projector that may project light characterizing an image or video to the retro-reflective screen. An array of optical elements or an individual optical element may be positioned between the retro-reflective screen and the projector. The array of optical elements or individual optical element may direct the light from the projector to the retro-reflective screen in a manner such that the image or video is viewable by a user at an observation angle of at least about 2 degrees.

15 Claims, 19 Drawing Sheets

Related U.S. Application Data

(60) Provisional application No. 62/255,218, filed on Nov. 13, 2015.

(51) Int. Cl.

| | |
|---|---|
| *G03B 21/60* | (2014.01) |
| *G02B 30/36* | (2020.01) |
| *G03B 21/28* | (2006.01) |
| *H04N 13/363* | (2018.01) |
| *G02B 30/35* | (2020.01) |
| *G03B 33/10* | (2006.01) |

(52) U.S. Cl.
 CPC ........... *G03B 21/60* (2013.01); *H04N 13/363* (2018.05); *G03B 33/10* (2013.01)

(58) Field of Classification Search
 USPC ................................. 359/459, 471
 See application file for complete search history.

(56) References Cited

U.S. PATENT DOCUMENTS

| | | | |
|---|---|---|---|
| 4,775,219 A | 10/1988 | Appeldorn et al. | |
| 5,382,987 A * | 1/1995 | Sperling | A61B 3/024 |
| | | | 351/206 |
| 5,606,458 A * | 2/1997 | Fergason | G02B 27/0172 |
| | | | 359/630 |
| 5,726,806 A * | 3/1998 | Holden | G02B 27/01 |
| | | | 359/630 |
| 5,763,049 A | 6/1998 | Frey et al. | |
| 6,323,999 B1 | 11/2001 | Ueda et al. | |
| 6,377,402 B1 * | 4/2002 | Ma | G02B 27/0172 |
| | | | 359/631 |
| 6,404,552 B1 | 6/2002 | Manabe | |
| 7,261,424 B2 | 8/2007 | Smith | |
| 7,370,981 B2 | 5/2008 | Couzin | |
| 10,012,841 B1 * | 7/2018 | Frayne | H04N 13/225 |
| 2010/0014053 A1 | 1/2010 | Brentnall, III et al. | |
| 2010/0253916 A1 | 10/2010 | Gao et al. | |
| 2011/0037951 A1 * | 2/2011 | Hua | G02B 13/04 |
| | | | 353/20 |
| 2011/0228054 A1 | 9/2011 | Gao et al. | |
| 2013/0342813 A1 | 12/2013 | Wang | |
| 2014/0119020 A1 * | 5/2014 | Duncan | G09G 3/3406 |
| | | | 362/276 |

FOREIGN PATENT DOCUMENTS

| | | |
|---|---|---|
| WO | WO-2016069625 A1 | 5/2016 |
| WO | WO-2017083782 A1 | 5/2017 |

OTHER PUBLICATIONS

Yoder, P.R., Study of Light Deviation Errors in Triple Mirrors and Tetrahedral Prisms, J. Opt. Soc. Am. 48, 496-499 (1958).

Office Action dated Nov. 5, 2019 in P.R.C. Patent Application No. 201680078930.6; 15 pages.

Office Action dated Jul. 27, 2020 in Chinese Application No. 201680078930.6.

International Preliminary Report on Patentability issued in PCT/US2016/061710 dated Mar. 17, 2017, in 7 Pages.

International Search Report and Written Opinion issued in PCT/US2016/061710 dated Mar. 17, 2017, in 10 pages.

* cited by examiner

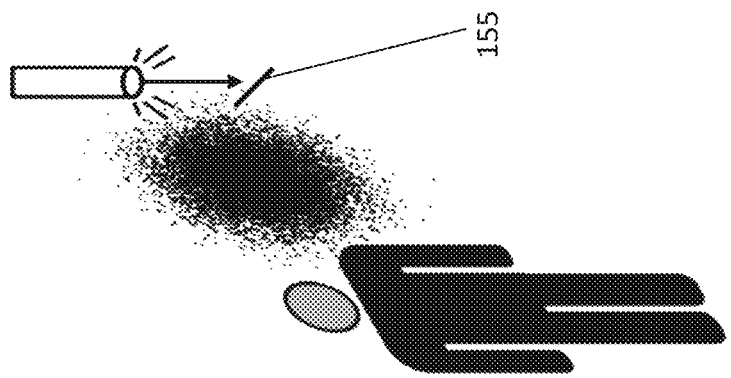
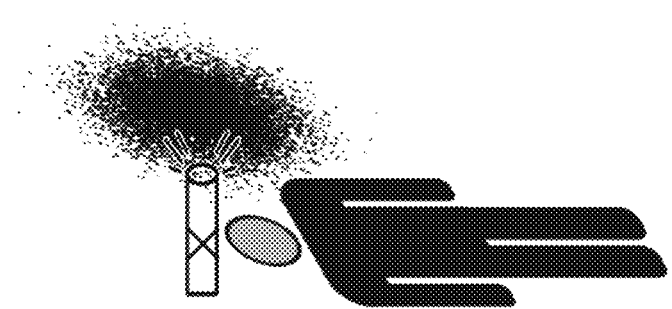
FIG. 17

METHODS FOR SYSTEM LAYOUT OPTIMIZATION FOR RETRO-REFLECTIVE BASED DISPLAY SYSTEMS

CROSS-REFERENCE

This application is a continuation application of International Application No. PCT/US2016/061710 filed Nov. 11, 2016, which claims priority to U.S. Provisional Patent Application Ser. No. 62/255,218, entitled "Methods for System Layout Optimization for Retro-Reflective Based Display Systems," filed Nov. 13, 2015, which is entirely incorporated herein by reference.

BACKGROUND

Current state-of-the-art display systems generally consist of either flat-panel displays or projector-based displays. The flat-panel displays are generally based on liquid crystal display (LCD) pixels with light emitting diode (LED) backlighting or plasma-based screens. In general, it is difficult to attain screen sizes significantly larger than 80 inches in the diagonal dimension due to various considerations. For flat-panel displays, nonlinear increases in cost as the screen size grows, as well as high power consumption, may limit screen sizes to below 80 inches at typical consumer price points. For projection-based displays, decreasing screen brightness and increasing power consumption, projector size, and projector noise may be significant limitations if the display size is increased above 80 inches. Another limitation of current state-of-the-art displays is that there does not exist a low-cost solution to enable multiple viewers to simultaneously observe individualized content on the same screen area. Additionally, for both types of displays there is currently no easy solution for glasses-free three-dimensional (3D) immersive viewing. Current 3D display systems rely on either active or passive glasses, or require the viewer to be located in a substantially constrained region of space in line-of-sight of the display.

SUMMARY

The present disclosure provides display systems and methods that address various limitations of currently available display systems and provides improvements to retro-reflective (RR) display systems. A display system of the present disclosure can include a projector and a RR screen, which can provide various non-limiting benefits over other systems currently available. For example, systems of the present disclosure may provide an immersive multiplayer gaming experience or simulation/training environment that does not currently exist with display systems currently available. As another example, systems of the present disclosure provide customized large area displays for advertising or other applications where it may be beneficial for multiple users to observe unique streams of content, in some cases at the same time. As another example, a display system of the present disclosure can permit multiple viewers to view individual customized images, video streams, or other content on the same screen area, in some cases simultaneously, as well as a glasses-free 3D immersive viewing capability.

The present disclosure provides methods to enable layout and system level configuration optimization for display systems utilizing a projector and a retro-reflective screen. Such display systems comprise a projector combined with a retro-reflective screen and a viewer distance from the projector such that an observation angle is substantially small, in some cases less than approximately 10 degrees, 5 degrees, 4 degrees, 3 degrees, 2 degrees, or 1 degree. The observation angle is defined as the angle between the line from the projector to any given location on the screen and the line from that same location on the screen to the eye(s) of the viewer. In certain applications, it may be desirable to enable different or larger optimal observation angles in order to increase or change the physical distance separating the projector(s) from the optimal viewing location. In other applications it may be desirable to increase or change the physical distance separating the projector(s) from the optimal viewing location through approaches other than changing the optimal observation angle.

The present disclosure provides systems and methods to enable an increase or change in the physical distance separating the projector(s) from the optimal viewing location in display systems utilizing a projector and a RR screen. The nature of retro-reflective display systems can enable significantly improved image brightness in comparison to a standard projector/reflective screen system. However, for many applications the ability to engineer the value of the observation angle that results in optimal retro-reflected light intensity can significantly improve both the intensity of light reaching a viewer's eyes as well as improve the perceived uniformity of the light reaching a viewer's eyes. Alternatively, increasing or changing the physical distance separating the projector(s) from the viewer in display systems utilizing a projector and a RR screen, without sacrificing brightness or perceived uniformity, can significantly improve the user experience for viewers.

An aspect of the present disclosure provides a method for adding an additional optical element in proximity to a retro-reflective screen such that the reflected light is returned at an angle that differs from being perfectly parallel to the incident beam of light by an engineered angle.

An aspect of the present disclosure provides a method for adding an additional optical element in proximity to a retro-reflective screen such that the reflected light is returned at an angle that differs from being perfectly parallel to the incident beam of light by an engineered angle. Other prior art has suggested to accomplish this by utilization of a single beam splitter which is approximately the same size as the screen to cover the extent of the image/video being projected. A beam splitter element is an optical element which reflects a portion of incident light in a specular manner and allows the remaining portion of light to be transmitted through the element. In this present disclosure, the optical element proposed is an array of smaller beam splitter elements rather than a single very large beam splitter element. This has the advantage over prior art of allowing a larger range of tuning and flexibility for the amount of change in observation angle for retro-reflective display systems. Additionally, by using an array of beam splitter elements, the retro-reflective display system can avoid various challenges associated with other proposed RR display systems incorporating beam splitters. One problem is that having the beam splitter near the observer's face results in a negative impact to the viewer's ability to have an unobstructed view of his/her ambient environment. The other challenge is when the beam splitter is placed near the RR screen, then the size of the beam splitter needs to be as large or larger than the screen size, which results in a large and difficult layout to implement.

In another aspect, the present disclosure provides a method for adding an additional optical element(s) in proximity to the projector such that there is an increase or change in the physical distance separating the projector(s) from the optimal viewing location without changing the optimal observation angle. In some embodiments, this may be a mirror element placed near the projector at an angle such that the optical path from the mirror to the projector is in a direction away from the viewer. Such a mirror can be small if placed in reasonably close proximity to the projector and may allow the viewer to benefit from the RR screen intensity increase without blocking his/her view. In some embodiments, it may be desirable to utilize a high throw ratio projector or optics resulting in a high throw ratio. Throw ratio is defined as the ratio of the distance of a projector from the screen divided by the width of the image projected on that screen. In these embodiments, it may be desirable to have the mirror be flat or curved in order to achieve the desired image size. The combination of a high throw ratio incoming to the mirror combined with a curved mirror may enable a larger separation of the projector from the viewer without necessitating a large mirror element.

For the aspects of the invention described above there may be different embodiments. In some embodiments, the projector(s) is mountable on a body or head of a viewer. In some embodiments, the projector(s) is not mounted to the viewer but rather mounted somewhere in the approximate vicinity of the viewer and/or the screen. In some embodiments, the retro-reflective screen comprises truncated corner cube reflectors. In some embodiments, the display system further comprises a sound system for providing sound to complement the image or video. In some embodiments, the image or video is stereoscopic in providing different images or video to the left and right eye respectively. In some embodiments, the projected images for multiple projectors are viewable by a plurality of viewers, each able to observe their own individualized content. In some embodiments, the plurality of viewers is at different locations with respect to the retro-reflective screen.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity. A better understanding of the features and advantages of the present invention will be obtained by reference to the following description that sets forth illustrative embodiments, in which the principles of the invention are utilized, and the accompanying drawings (also "figure" and "FIG." herein), of which:

FIG. 17 provides an alternate schematic view that illustrates projector to viewer distances without the proposed method (left) versus with the proposed method (right);

DETAILED DESCRIPTION

Figure 1:
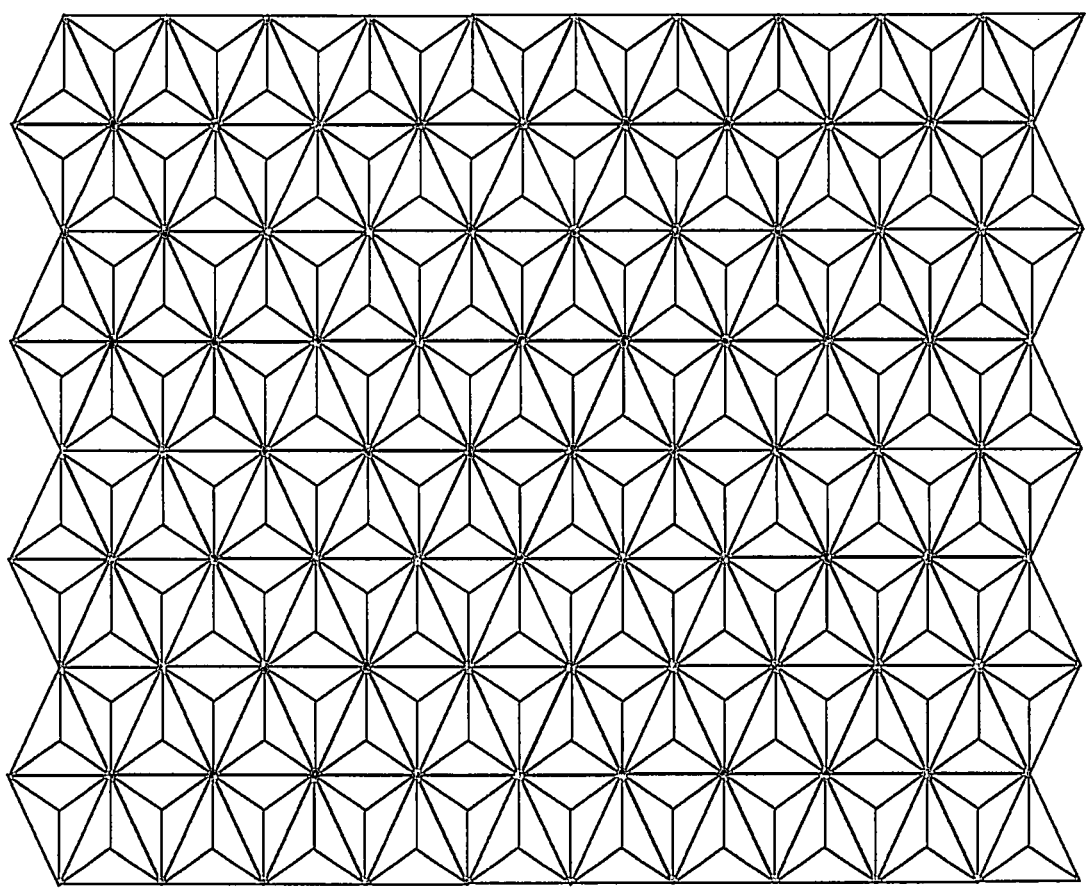
FIG. 1 schematically shows a magnified front view of a portion of a representative retro-reflective screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "retroreflective" (also "retro-reflective" or "retro reflective" herein or abbreviated to "RR"), as used herein, generally refers to a device or surface that reflects light back to its source with a minimum scattering of light. In a retroreflective screen, an electromagnetic wave is reflected back along a vector that is parallel to but opposite in direction from the source of the wave. A retroreflective screen comprises a retroreflective surface comprised of many small individual corner cube reflective elements or other RR elements such as reflective beads.

The term "corner cube reflective element", as used herein, generally refers to a reflective partial cube composed of three mutually perpendicular, nearly perpendicular, or angled flat reflective surfaces. With this geometry, incident light is reflected back directly towards the source.

The term "projector," as used herein, generally refers to a system or device that is configured to project (or direct) light. The projected light can project an image or video or text or any other image content.

The term "observation angle," as used herein, generally refers to an angle between a first line directed from a projector to a given location on a screen and a second line from that same location on the screen to one or more eyes of a viewer.

The term "return angle," as used herein, generally refers to the angle between an incident beam of light and the reflected beam of light from a screen. For a typical surface, the return angle has a broad range of values. For a retroreflective screen that has not been formed as described herein, the return angle typically has a very small spread of angles centered around zero.

The term "incidence angle," as used herein, generally refers to an angle between a first line directed from a projector to a given location on a screen and a second line that is normal to the nominal front surface of the corner cube. The nominal front surface of the corner cube is defined as the surface perpendicular to and intersecting the midpoint of a line from the corner of the corner cube structure to the hypothetical opposite corner of the cube if the corner cube were to have been a full cube.

The term "optical cross-talk" (also "cross-talk" herein), as used herein, generally refers to retro-reflected light from a projector that reaches a viewer (or eye of a viewer) that was not intended to receive the light. This can result in a poor 3D viewing experience exhibited by "ghosting" which is a term used herein to describe double images seen by viewers where only one image is intended. The term "perceived cross-talk" as used herein, generally refers to the ratio of the intensity of undesired retro-reflected light from a projector that reaches a viewer (or eye of a viewer) relative to the intensity of desired retro-reflected light. There may be scenarios where absolute cross-talk intensity has decreased, but the intensity of desired light has decreased by an even larger amount, resulting in worsening in perceived cross-talk.

Retro-Reflective Display Systems

The present disclosure provides improvements to RR display systems to allow optimizing observation angles in these RR display systems. In this manner the brightness and uniformity of projected images can be improved for a given systems level configuration. The display system can be used with any retro-reflective display application.

Retro-reflective screens reflect incident light along a direction that is substantially opposite to the direction of propagation of the incident. This directional reflection of light can enable significantly improved brightness. Retro-reflective screens are comprised of an array of retro-reflector elements. Each retro-reflector screen element is typically comprised of three intersecting reflecting planes intersecting at approximately 90 degrees. These elements are often called corner cubes. The retro-reflective screen can also be comprised of truncated corner cube reflectors. The retro-reflective screen can also be comprised of non-corner cube based elements such as reflecting beads, although the spread of reflected light from these screens is typically larger than from corner cube arrays. The reflective planes within the retro-reflector elements can be comprised of front surface reflective planes or back surface total-internal reflective planes.

A retro-reflective display system comprises a retro-reflective screen having retro-reflective screen elements that reflect light along a direction that is opposite in direction to the incident light. The system further comprises at least one projector that projects the light onto the retro-reflective, which light characterizes an image, video, text or other media content.

Optimally, retro-reflective display system can operate without the need of a beam splitter or diffuser layer, thereby advantageously providing for reduced complexity and/or cost as well as avoiding an approximately 4× or greater reduction in intensity compared to a system not using a beam splitter. Further details on the challenges of using a simple beam splitter are described elsewhere herein.

In some cases, the system comprises multiple projectors. For example, the system can include two projectors that provide a stereoscopic image or video for 3D viewing. Additionally, the system can have multiple projectors with each projector (or pair of projectors in close proximity) targeted for a given user. Multiple users may then each view their own individualized content simultaneously on the same screen area.

The image or video can be stereoscopic in order to portray a three-dimensional view. For example, the image or video is rendered by more than one projector such that, upon reflection by the retro-reflective screen, the image or video is different for the left and right eyes of a viewer. In some cases, the image or video is stereoscopic or three-dimensional without the use of any optics immediately in front of the eyes, such as 3D glasses.

The projector can be mountable on a body of a viewer. In some examples, the projector is mountable on a head of the viewer. The projector can be mountable with a support member, such as body or head support member (e.g., support strap(s)). The projector can also be mounted at a fixed location, independent of the viewer such that a viewer may enter the range of the projector.

The display system can include a sound system for providing sound to complement the image or video. The sound can go along with a viewer's viewing experience, such as by way of headphones or other local speaker system.

The retro-reflective can have various sizes and configurations. The screen can be substantially flat or curved. The screen can have a width of at least about 1 meter (m), 10 m, or 50 m, and a height of at least about 1 m, 10 m or 50 m. In certain settings, a large area display can be effective for advertising purposes, or other showcase demonstrations, due, at least in part, to the qualities of the display size and the ability to have multiple observers view unique images/videos/text on the same screen area.

FIG. 1 shows a front view of a representative retro-reflective screen. The retro-reflective screen is comprised of an array of truncated corner cube reflectors. The corner cube reflectors may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors is smaller than the anticipated or predicted pixel size of the projected image, with the pixel size determined by the combination of the projector display system and the distance of the projector from the retroreflective screen.

Figure 2:
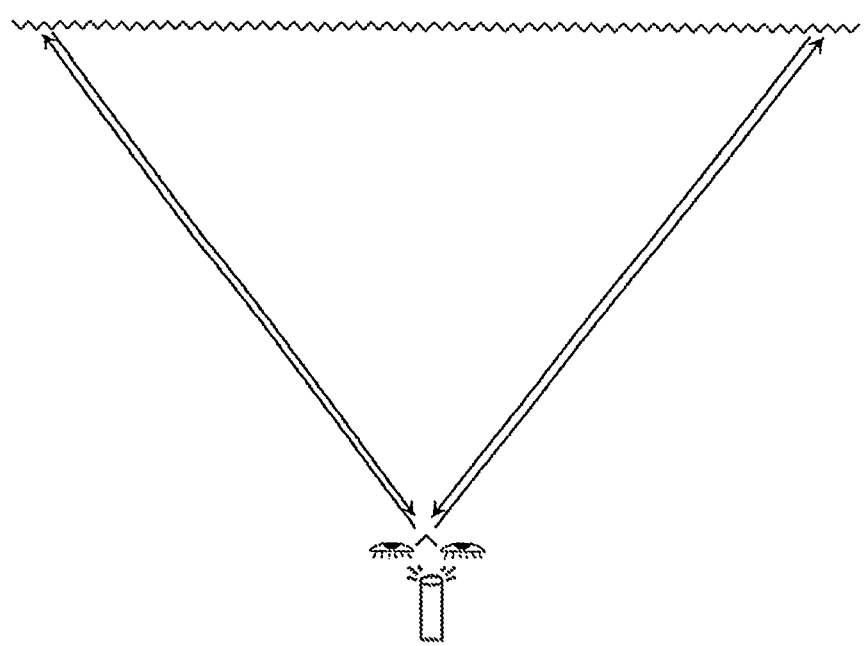
FIG. 2 schematically shows a top view of a representative retro-reflective screen and projector system with the viewer facing the screen.

FIG. 2 shows a schematic top view of a system having a projector and a retro-reflective screen. The retro-reflective properties of the screen cause a majority of the light incident upon the screen to be reflected back towards the projector in a tight directional cone of light regardless of the incident angle. This is in contrast to some conventional screens which scatter incident light in a relatively isotropic manner. In such a conventional screen set up only a very small fraction of the light incident on the screen actually impinges upon the viewer's eyes. Because of the retroreflective effect with this type of system, if the viewer's eye is in close proximity to the projector such that the angle defined by the path from the projector to the reflective screen and returning to the viewer's eye is small, then the brightness of the image may be increased significantly over a conventional projector and reflective screen set up. The system of FIG. 2 in some cases does not have a beam splitter.

Figure 3:
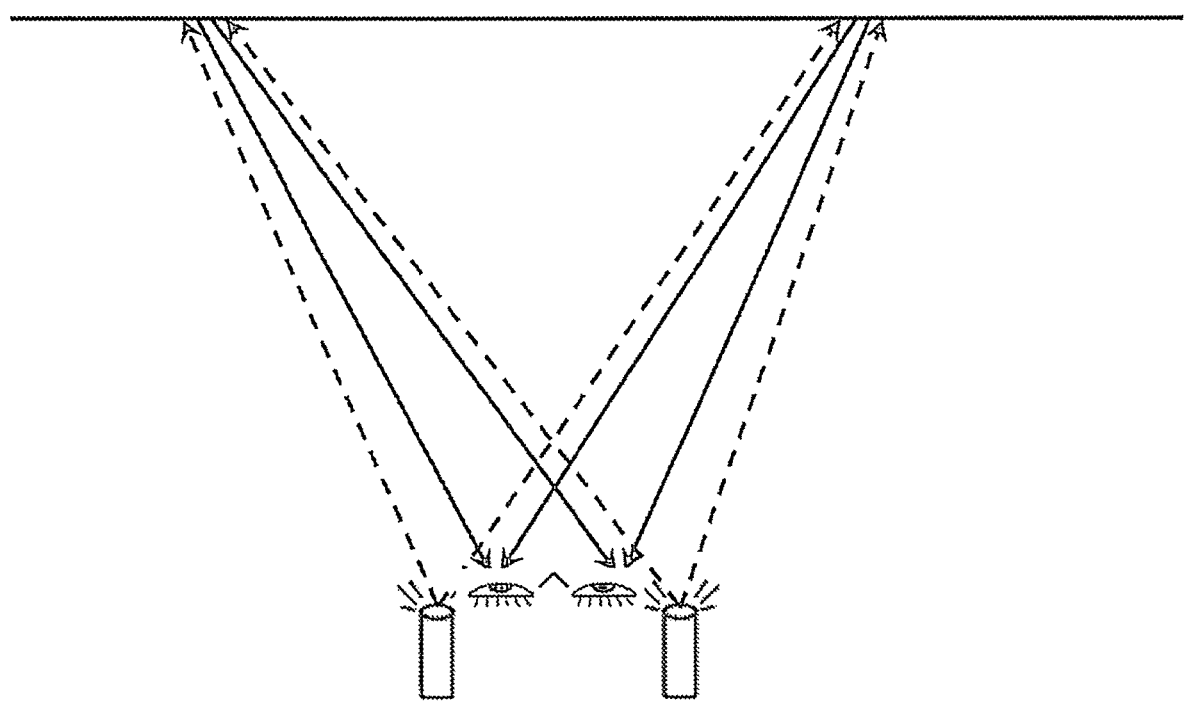
FIG. 3 schematically shows a top view of a representative retro-reflective screen and projector system utilizing two projectors, with one projector in proximity to each eye.

FIG. 3 schematically shows a top view of a representative retro-reflective screen and projector system with the use of two projectors in order to obtain a stereoscopic effect. In this setup, the image projected from the right projector may predominantly be seen by the right eye and similarly for the left projector and left eye. A goal in this type of display setup may be to minimize the brightness of the image from the right projector to the left eye and from the left projector to the right eye (also referred to as "cross-talk"). If cross-talk and perceived cross-talk can be sufficiently minimized, then a glasses free 3D can be enabled.

Figure 4:
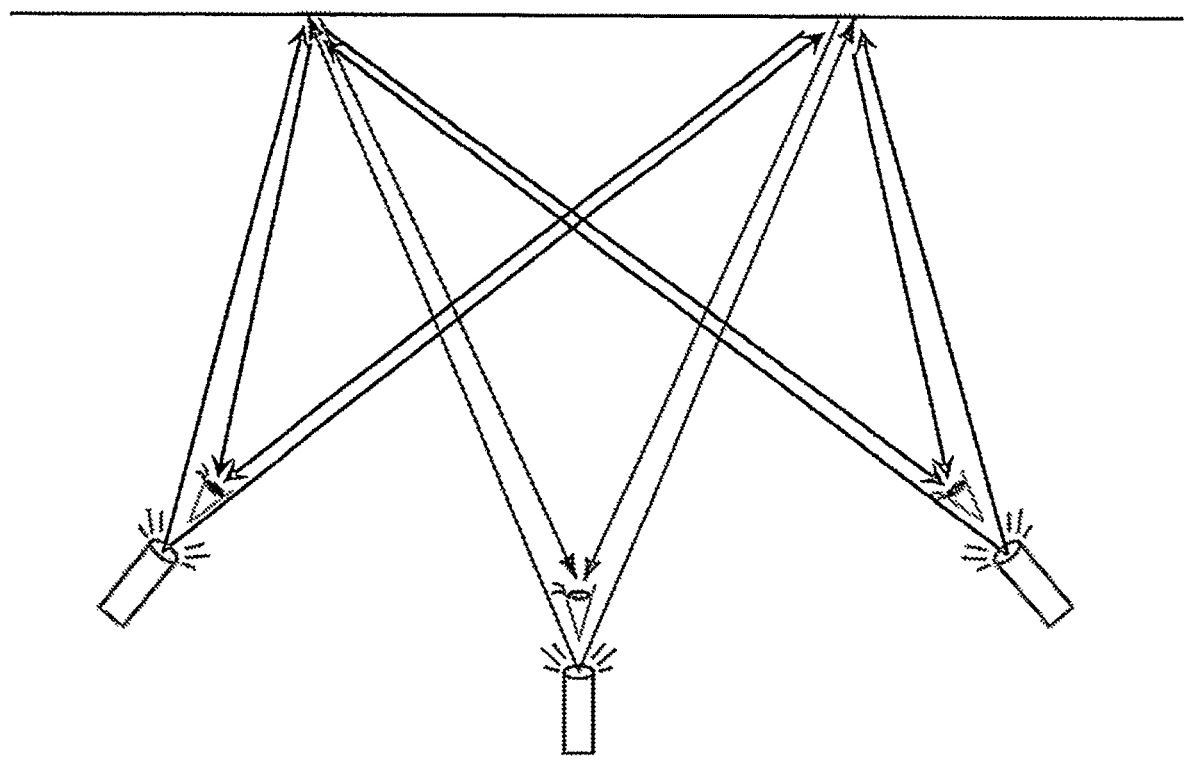
FIG. 4 shows a top view of a schematic showing the capability to have multiple users/eyes viewing independent image or video sources.

FIG. 4 is a top view of a schematic showing the capability to have multiple viewers viewing independent image or video sources. Projectors, light rays corresponding to projected light, and viewer eyes are illustrated in the figure.

Figure 5:
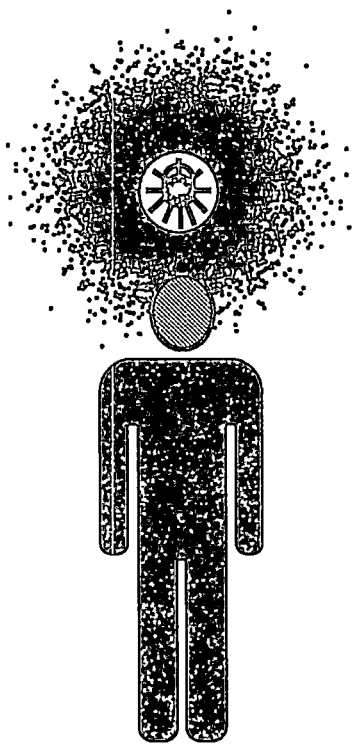
FIG. 5 shows a schematic of Monte Carlo simulation results for the angular distribution of retro-reflected light from a representative retroreflective screen without the proposed method with a viewer and projector also shown.

FIG. 5 shows Monte Carlo simulation results for the angular distribution of retro-reflected light from a representative retroreflective screen. Variations and non-perfect uniformity in the retroreflective screen have been emulated by inducing slight variations in the normal vector for each surface of the three reflective surfaces that comprise a retro-reflective corner cube element. It can be observed that the bulk of the light rays from the projector reflect back with a small return angle. The distribution of return angles shown in FIG. 5 is representative only and actual return angles may have distribution profiles with a different spread of angles depending on the specific properties of each retro-reflective screen. We can see in this figure that a projector mounted even a slight distance away from a viewer's head will result in the viewer's eyes being outside of the range of angles wherein the bulk of the reflected intensity resides. This will result in poor image brightness and uniformity unless a new method is used.

Figure 6:
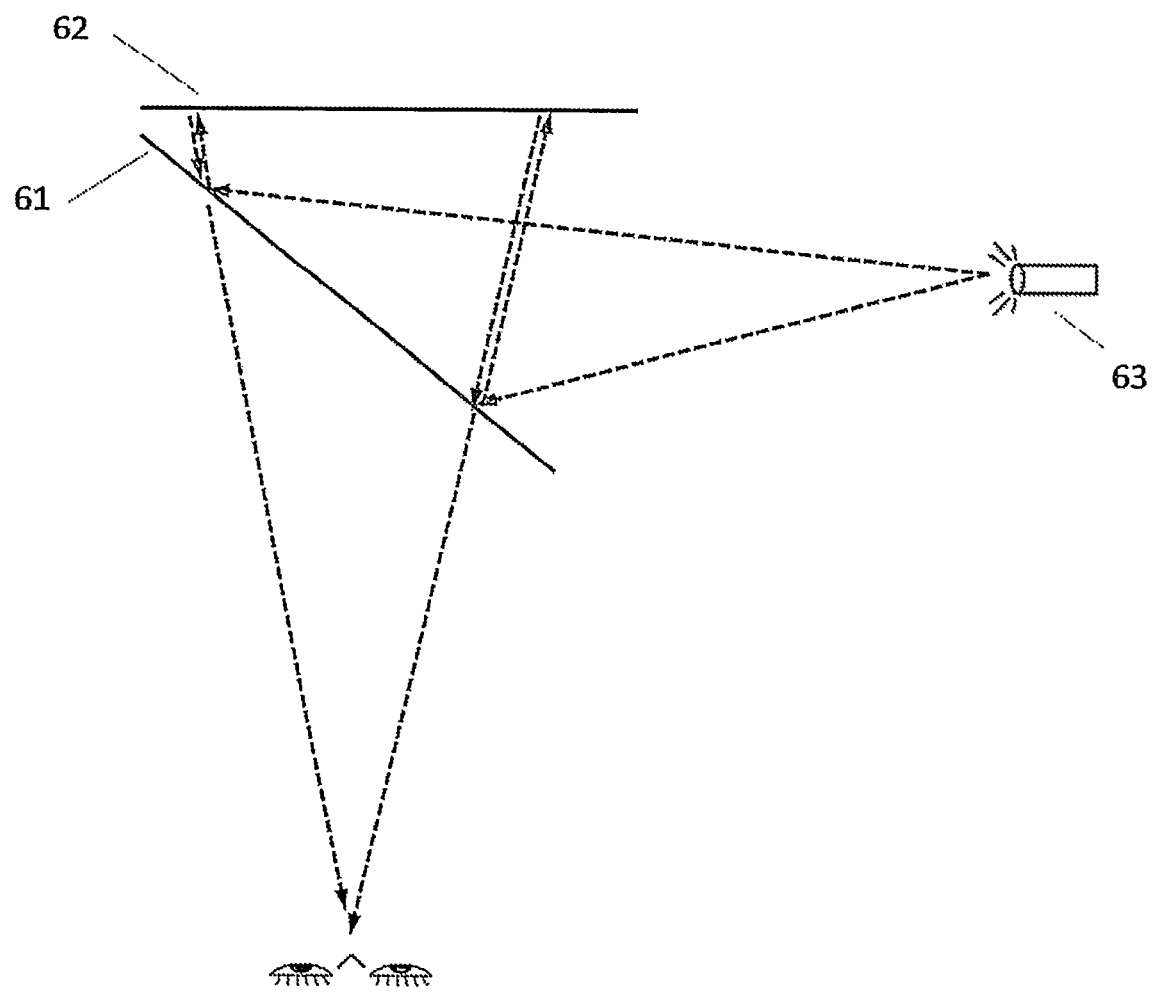
FIG. 6 shows a schematic illustration of how a retro-reflective display system using a near screen beam splitter results in a bulky configuration and a 4× loss in intensity.

FIG. 6 shows a schematic illustration of a retro-reflective display system using a beam splitter 61 near the RR screen 62. In FIG. 6, the projector 63 projects light onto a beam splitter 61 which is positioned at an angle relative to the RR screen 62 located at the top of the figure. This type of configuration is non-optimal for a number of reasons. Firstly, the use of a simple beam splitter near the screen results in a bulky configuration and large system footprint. For example, if the desired screen size is 20 feet in width, the beam splitter will likely need to be around 25 feet long and when placed at the requisite angle relative to the RR screen. Since this angle is not flat to the RR screen, this configuration will result in a very large system footprint. In addition, as can be seen in FIG. 6, the projected image passes through the beam splitter twice. This results in a multiplicative 50% intensity loss times 50% intensity loss which equates to a 4× loss in intensity. Additionally, if the beam splitter is larger than a 50%/50% beam splitter, such as a 75%/25% beam splitter, then the intensity loss may be even more significant. For example, a 75%/25% beam splitter configured as shown in FIG. 6 results in a 5.3× loss in intensity when a projected image passes through the beam splitter twice.

Figure 7:
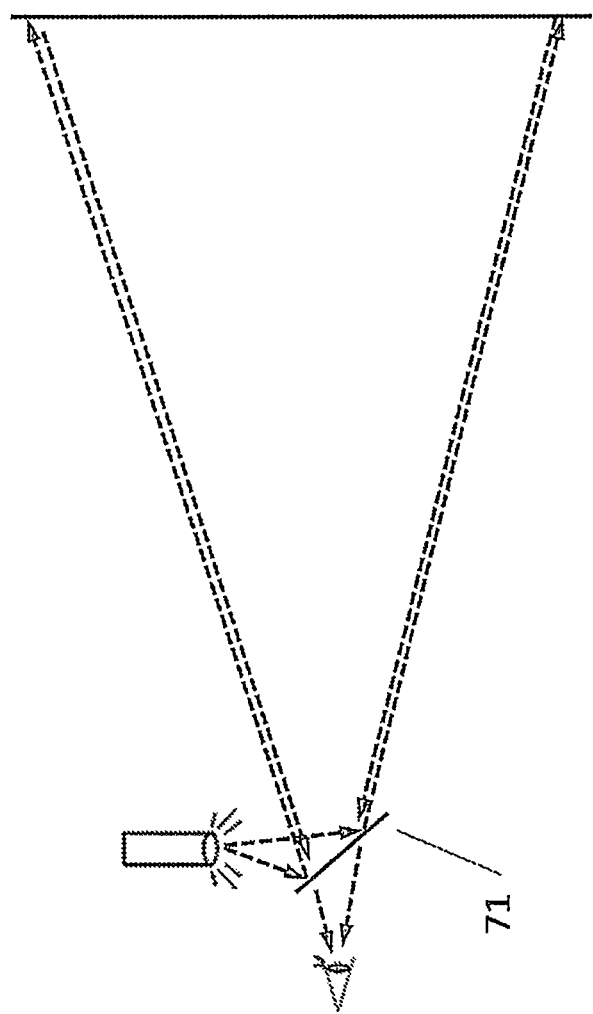
FIG. 7 shows a schematic illustration of a retro-reflective display system using a near face beam splitter which prevents unimpeded viewing of the ambient environment and a 4× loss in intensity.

FIG. 7 shows a schematic illustration of a retro-reflective display system using a near face beam splitter 71. While this configuration results in minimal impact to the overall system size, having a near face beam splitter prevents unimpeded viewing of the ambient environment. In addition, a near face beam splitter may result in 4× or greater loss in intensity. In additional embodiments, a different type of optical element other than a beam splitter may be used that results in a similar reflection/transmission of light. For example, a different type of optical element that may be used includes prism based optical elements that effectively split the incoming beam of light such that the combination of reflected, transmitted and retro-reflected light paths result in a return path of light that is at a significant offset angle compared to the original incoming beam of light.

Figure 8:
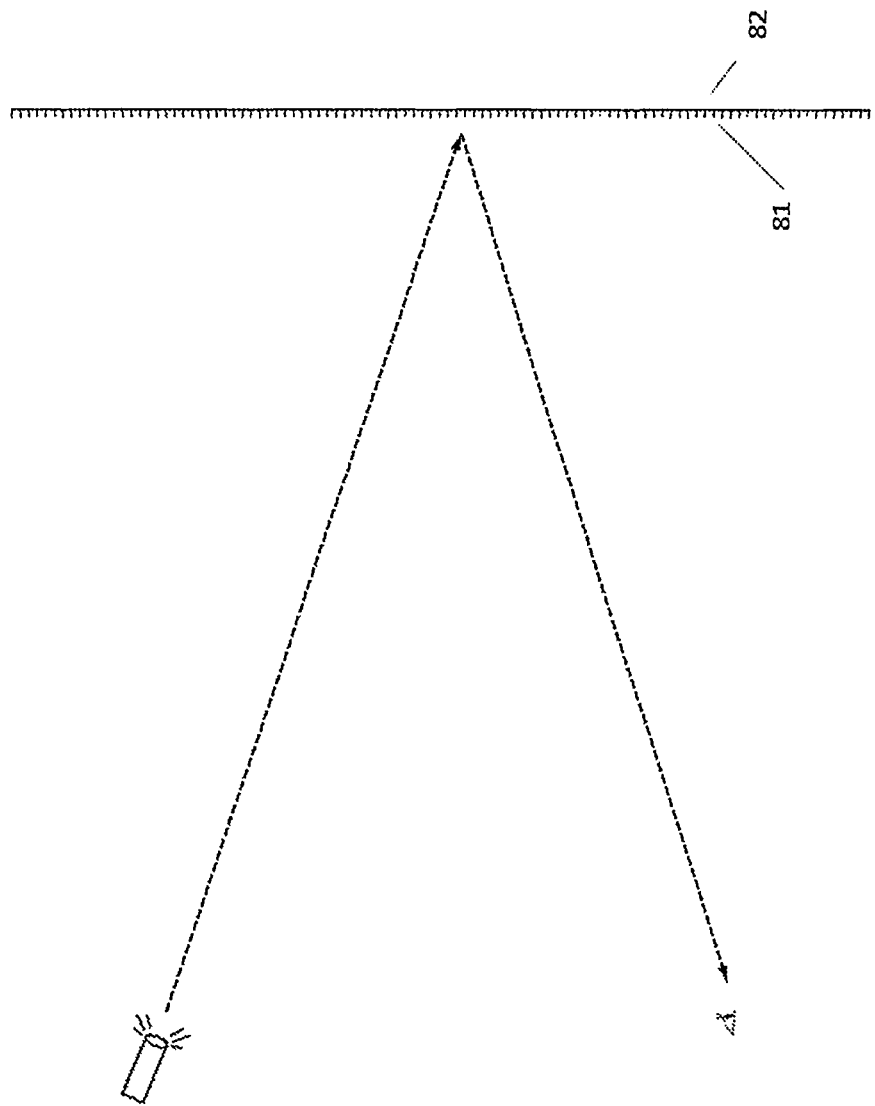
FIG. 8 shows a low magnification schematic view of a potential near screen array of beam splitters with relative small angular offsets from the perpendicular direction to the screen.

FIG. 8 shows a low magnification schematic view of a potential near screen array of beam splitters 81 with specific angular offsets from the perpendicular direction to the RR screen 82. Details on methods to determine the angles are outlined in subsequent figures and corresponding description. The array of beam splitters is placed in front of the retro-reflective screen. Similar to FIG. 7, different types of optical elements may be used instead of, or in addition to, beam splitters that result in a similar reflection/transmission of light. In this figure, the vertical line represents the RR screen 82, while the array of short, nearly horizontal lines are the array of beam splitters 81. This configuration results in minimal impact to the system level footprint, and because it is not a near face solution, will still allow an unimpeded view of the surroundings. Additionally, as may be seen in more detail below and in subsequent figures, the image intensity and brightness with this setup may be 2× better than a beam splitter setup such as shown in FIGS. 6 and 7.

Figure 9:
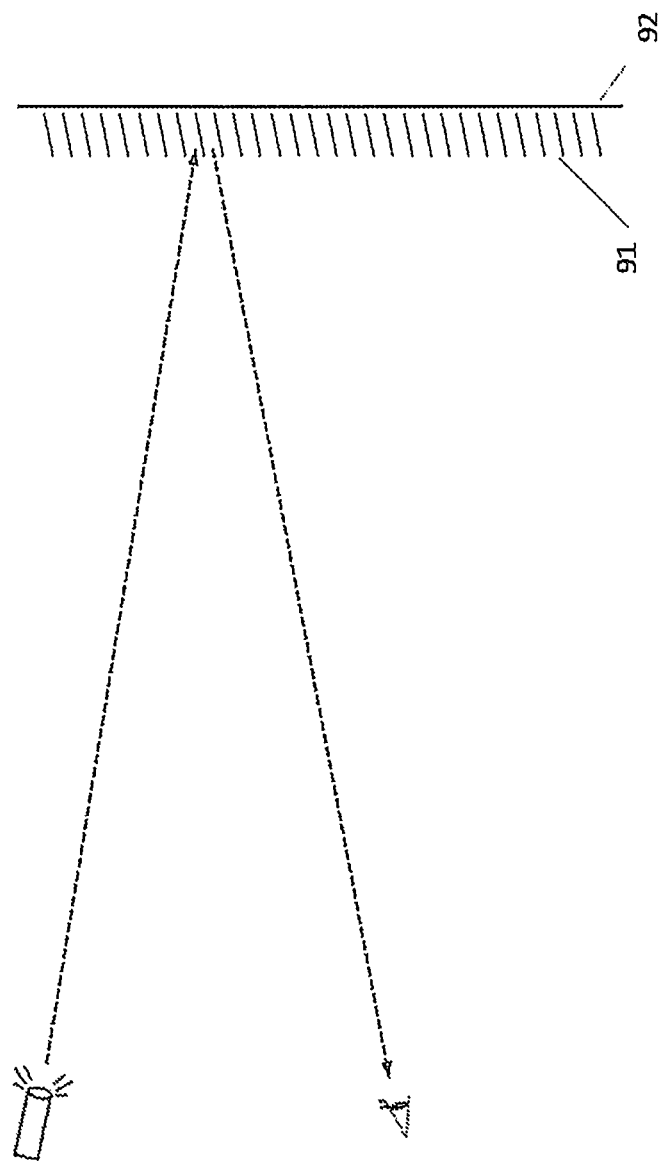
FIG. 9 shows a med magnification schematic view of a potential near screen array of beam splitters with relative small angular offsets from the perpendicular direction to the screen.

FIG. 9 shows a slightly higher magnification schematic view of a potential array of beam splitters 91 placed in close proximity to a RR screen 92. In this figure, we can see the relatively small angular offsets from the perpendicular direction to the screen. The array of beam splitters 91 may be touching the RR screen 92 or may have some small physical separation from the RR screen 92. In this figure, we draw the array of beam splitters as strips for illustrative purposes. The array of beam splitters can be configured as a 2-dimensional array of squares/rectangles/shapes or as a 1-dimensional array of beam splitter strips. In examples, the beam splitter size may be comparable or smaller than the pixel size since the beam splitter may mirror image the portion of the image that strikes the beam splitter. Since RR display systems are generally expected to be relatively large, this size may not be unduly restrictive. For example, a high resolution projector with 1080 lines in the vertical direction projecting a 3 meter tall image may have a vertical pixel size of 3 mm. Additionally, the beam splitters may also be made of an array of fewer, but larger panels if the different segments have a mirror image function implemented at or before the projector in either software or hardware. As long as the panel size remains significantly below the size of a single panel beam splitter, this may be engineered to have minimal impact on overall system footprint. The direction of the projector relative to the beam splitter may be fundamentally different in comparison to the configurations shown in FIGS. 6 and 7. As seen in FIGS. 6 and 7, the projector is on the side of the acute angle (<90 degrees) between the beam splitter and the screen. In FIG. 9, the projector is on the side of the obtuse angle (>90 degree) between the beam splitter and the screen. As such, the approach and reflections achieved are fundamentally different for FIGS. 6 and 7 versus what is proposed in the context of FIG. 9. While FIG. 9 illustrates the use of beam splitters, in other embodiments different types of optical elements may be used. For example, optical elements may be used that have the same or similar reflection/transmission of light.

A beam splitter array can include a plurality of individual beam splitters. Each of the individual beam splitters can be disposed on a surface, such as a surface of a retro-reflective screen or a separate support adjacent to the retro-reflective screen. Each of the individual beam splitters can be oriented at an angle of less than about 45°, 40°, 35°, 30°, 25°, 20°, 15°, 10°, or 5° with respect to a surface normal of the surface. Each of the plurality of individual beam splitters can direct light from a projector to the retro-reflective screen to provide an observation angle of at least about 1 degree, 5 degrees, 10 degrees, 15 degrees, 20 degrees, 25 degrees, 30 degrees, 35 degrees, 40 degrees, or 45 degrees.

Figure 10:
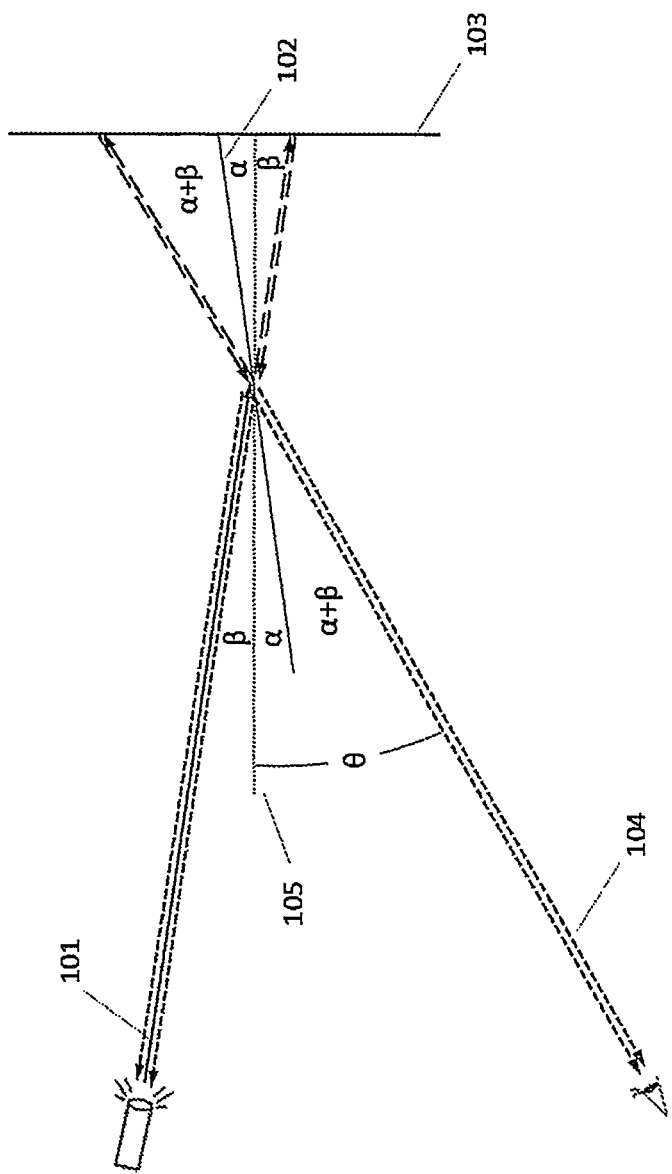
FIG. 10 shows a schematic view of a potential near screen array of beam splitters with relative small angular offsets from the perpendicular direction to the screen, with focus on a single beam splitter element and with angles labeled.

FIG. 10 shows a schematic view of a potential near screen array of beam splitters with relatively small angular offsets from the perpendicular direction to the screen, with focus on tracing a single beam and the light paths of that beam as it partially reflects off and passes through a single beam splitter element. In this FIG. 10, when the incident beam 101 reaches the beam splitter 102, approximately 50% of the intensity passes through and approximately 50% of the intensity is reflected (long dashed lines). The reflected and transmitted light reaches the RR screen 103 and each component retro-reflects back towards the beam splitter.

At the beam splitter, each of the retro-reflected components with intensity of 50% undergoes another splitting. There are now 4 beams each with approximately 25% of the intensity of the incident beam. Of these 4 beams, 2 beams return in the direction of the projector and 2 beams 104 are directed to the intended viewer. The angles are labeled as follows. The angle α is the angle of the beam splitter 102 relative to a horizontal direction 105. The angle β is the angle of the incident beam 101 relative to a horizontal direction 105. The angle α+β is the angle between the incident beam 101 and the beam splitter 102. With this diagram, the angle θ may be determined to denote the angle formed by the line from the observer to the beam splitter. Additionally, the horizontal directly may be determined to be θ=2α+β. Additionally, the observation angle can be tuned in order to optimize system design while still retaining ~2× higher relative intensity compared to a simple beam splitter system and while keep system foot print small and not blocking the ambient field of view.

While beam splitter elements are illustrated in FIG. 10, other embodiments of the invention may utilize different optical elements that result in the splitting of the beam. For example, different optical elements may include prismatic elements. In particular, as seen in FIG. 10, some portions of the light that is provided from the projector may proceed unimpeded while some portions of the light that is provided from the projector may be reflected. Additionally, a portion of the two respective portions of light may come back to the user's eyes having an offset of the angle from the projector and the viewer's location. In some examples, the offset may be at least 4 degrees. In some examples the offset may be more than 4 degrees. In some examples the offset may be 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, or more than 60 degrees.

In some examples, a prismatic element may be used as opposed to, or in addition with, other optical elements such as beam splitters so as to provide light to a user at desired offset angles. In particular, light from a projector that passes through a prismatic element may reflect off of the retro-reflective screen and have an angle that is largely different than the incident source of light from the projector. For example, the light may have an angle that is offset from the incident source of light by an offset of 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, or more than 60 degrees.

Figure 11:
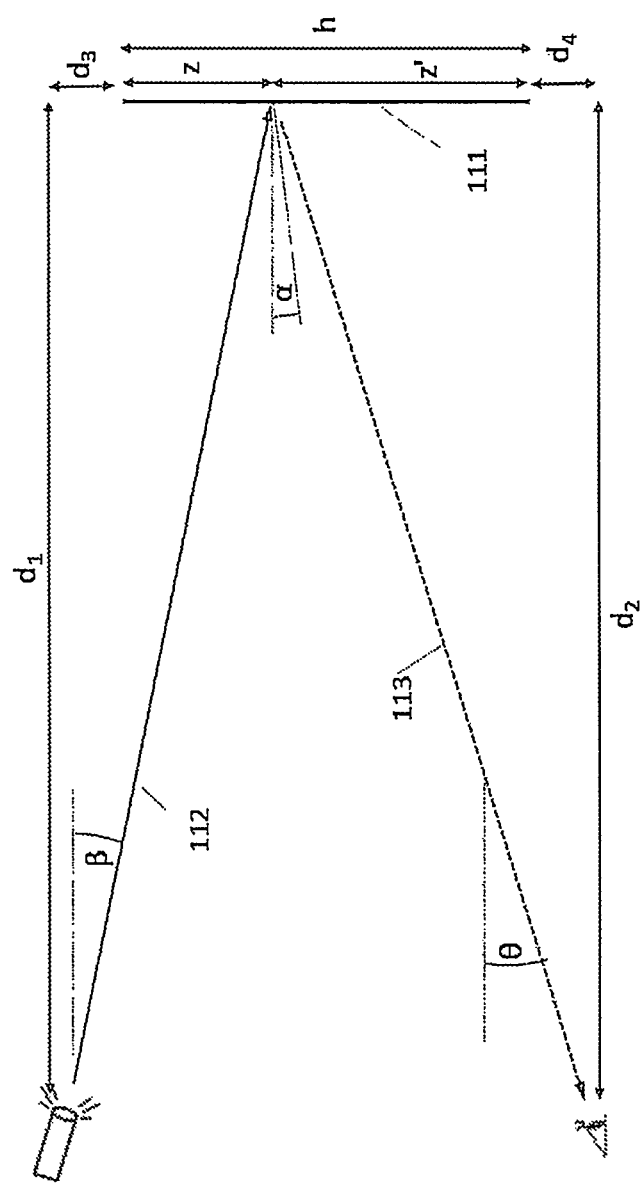
FIG. 11 shows a schematic view of a potential near screen array of beam splitters with relative small angular offsets from the perpendicular direction to the screen, with labeling of system level dimensions.

FIG. 11 shows a schematic view of a potential near screen array of beam splitters with relative small angular offsets from the perpendicular direction to the screen, with labeling of system level dimensions. In this figure, the individual beam splitter elements are not shown, and a single vertical line 111 is used to represent both the array of beam splitters and the RR screen. A single incident beam of light 112 and a corresponding reflected beam of light 113 are shown. Definitions for α, β and θ are unchanged from the definitions given in the FIG. 10 description. Additional dimensions are defined as follows: $d_1$ denotes the horizontal distance of the projector from the screen, $d_2$ denotes the horizontal distance of the viewer from the screen, $d_3$ denotes the vertical distance of the projector from the top of the screen, $d_4$ denotes the vertical distance of the viewer from the bottom screen, z denotes the vertical distance of the intersection of the incident beam of light with the screen/beam splitter array from the top of the screen, z' denotes the vertical distance of the intersection of the incident beam of light with the screen/beam splitter array from the bottom of the screen, and h denotes the height of the screen.

With these dimensions labeled, the optimal angle for a as a function of vertical location relative to the retro-reflective screen may be determined, as follows:

$$\alpha = \frac{1}{2} * \left[ \mathrm{atan}\left(\frac{d_4 + h - z}{d_1}\right) - \mathrm{atan}\left(\frac{d_3 + z}{d_2}\right) \right]$$

Note that due to the different top/bottom distances, further optimization beyond using a 1-dimensional array of strip based beam splitter may be achievable by utilizing a 2-dimensional array of beam splitters. The beneficial impact of doing this may be relatively small due to the distance from the projector/viewer to the screen typically being significantly larger than the size of the screen. However, in cases where the distance from the projector/viewer to the screen is on the order of the screen size, or smaller, this configuration may further improve intensity and uniformity.

Figure 12:
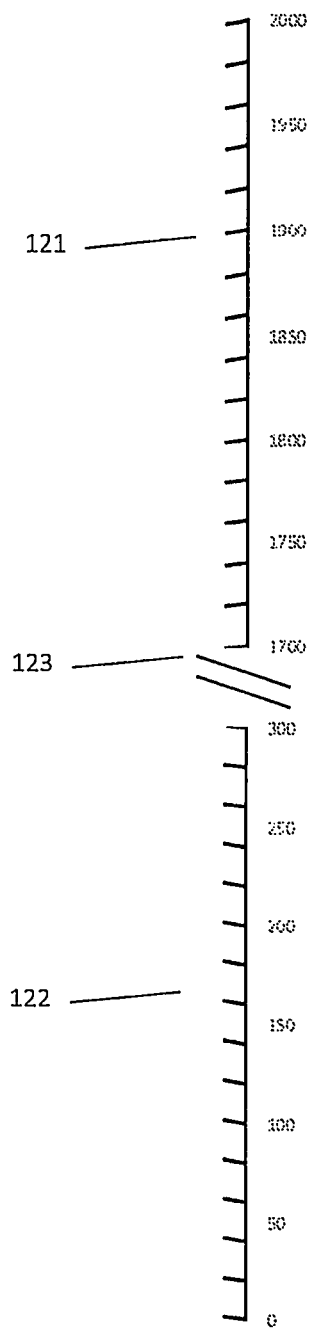
FIG. 12 shows schematic representation of portions of a representative array of beam splitters showing how the optimal angle of the beam splitters may change as a function of location on the screen.

FIG. 12 shows schematic representation of portions of a representative array of beam splitters showing how the optimal angle for a changes as a function of location on the screen. In order to be able to view the beam splitters, the x and y scales in the figure are not necessarily drawn to scale. Additionally, only the top 121 and bottom 122 of the representative two-meter screen height is drawn in this figure. In particular, the portions of height are represented as ranging from 0 mm to 2000 mm. The numbers to the right of the screen represent distance in millimeters from the bottom of the screen. A break point symbol 123 represents portions of the screen that are not shown. It can be seen that at the top region of the beam splitter array/RR screen 121 the values for optimal a result in having the beam splitters angled with a slightly positive value for a, while at the bottom region of the beam splitter array/RR screen 122 the values for optimal a result in having the beam splitters angled with a slightly negative value for a. With respect to manufacturing approaches for array of beam splitters, multiple approaches may be used, ranging from individual assembly of individual beam splitters to processes which achieve the array of beam splitters in a parallel process. Additionally, the array of beam splitters may be completely distinct and physically separate from the RR screen, or the array may be manufactured in the same process as, and tightly integrated with, the RR screen. The array of beam splitters may also be manufactured separately from the RR screen, but then tightly integrated or connected to the RR screen in a separate and subsequent processing operation. As discussed in FIGS. 10-12, beam splitters may be replaced or augmented with different forms of optical elements that may have the same or similar reflection/transmission of light compared with beam splitters.

Figure 13:
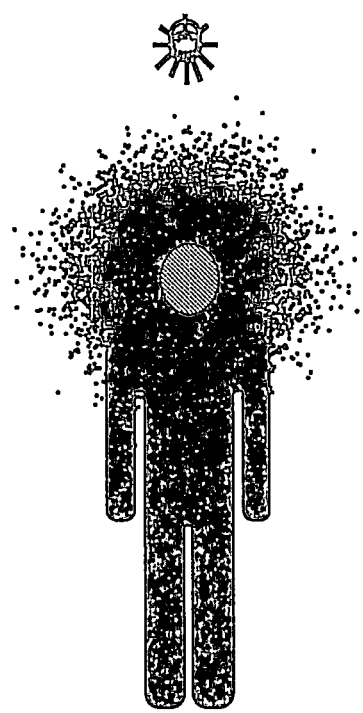
FIG. 13 shows Monte Carlo simulation results for the angular distribution of retro-reflected light from a representative retroreflective screen with the proposed method with a viewer and projector also shown.

FIG. 13 shows a representative schematic of Monte Carlo simulation results for the angular distribution of retro-reflected light from a representative retroreflective screen with the proposed array of beam splitters with a viewer and projector also shown. We see in this figure that the physical distance separating the projector and the viewer's head may be increased, which has benefit of, for example, a more flexible system design and a better user experience in the form of reduced noise and improved comfort. Additionally, in comparison to FIG. 5, we can also see that the center of the RR beam profile can be engineered to be more centered on the viewer's eye which may result in improved intensity and uniformity of light received by the user.

Figure 14:
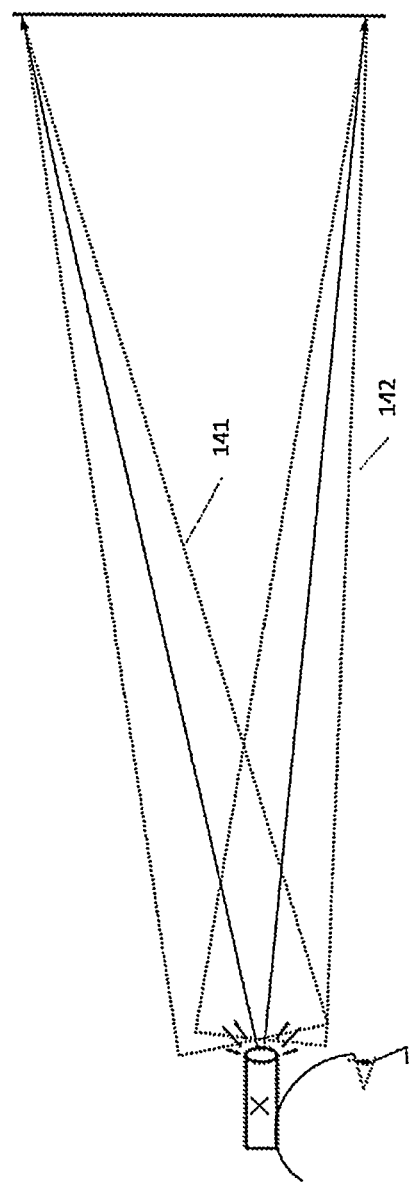
FIG. 14 shows a schematic view of a side view for a viewer with a projector above the head showing that the projector needs to be in very close proximity to the viewer.

FIG. 14 shows a schematic view of a side view for a viewer with a projector above the head showing that the projector is in very close proximity to the viewer for a retro-reflective display system if no additional methods are applied. Retro-reflective screens may cause light to be reflected in a tight cone around the direction of the incoming beam of light. In this figure, the light retro-reflected from the top of the screen is schematically shown by a cone 141. Similarly, another cone 142 is used to show the light retro-reflected from the bottom of the screen. Because of the tight cone distribution, even with a projector directly on top of a viewer's head, the eyes of the viewer may be outside of the ideal locations within the tight cone of retro-reflected light. While the viewer may still see some light intensity, the benefit of the intensity increase from retro-reflection may be significantly diminished.

Figure 15:
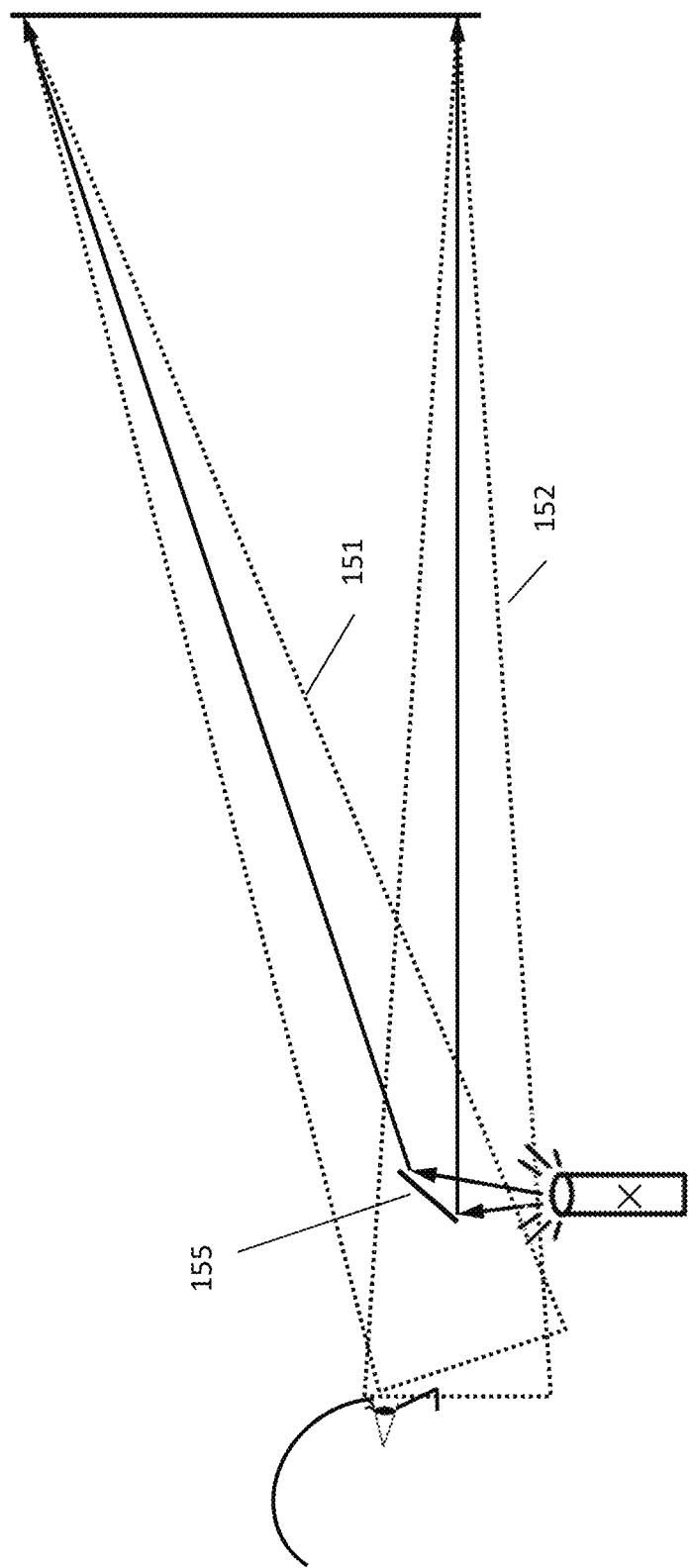
FIG. 15 shows a schematic view of a side view for a viewer with a projector combined with a reflecting optical element that enables an increased distance between projector and the viewer.

FIG. 15 shows a schematic view of a side view for a viewer with a projector combined with a reflecting optical element 155 that enables an increased distance between projector and the viewer. This is a different aspect of the invention which does not require use of the array of beam-splitters described above. In this figure, the light retro-reflected from the top of the screen is schematically shown by a cone 151. Similarly, another cone 152 is used to show the light retro-reflected from the bottom of the screen. In this scenario, the projector (which may be rotated) and a mirror is used near the projector to reflect the projected image or video towards the RR screen. With this configuration, we see that the projector can be placed further from the viewer while still allowing the viewer's eyes to be within the cone of retro-reflected light such that the user may benefit from the intensity increase provided by the RR screen. In this representative example, the projector is in front and below the location of the eyes of the viewer. Other configurations with the projector place above or to the sides of the viewer are also possible.

The mirror 155 can be disposed above or below a plane of an eye of a user. The position of the mirror may be adjustable. The mirror can direct light from the projector to the retro-reflective screen such that, upon reflection from the retro-reflective screen, the image or video is viewable by the user at an observation angle that is less than about 30°, 25°, 20°, 15°, 10°, 5°, or 1°.

Figure 16:
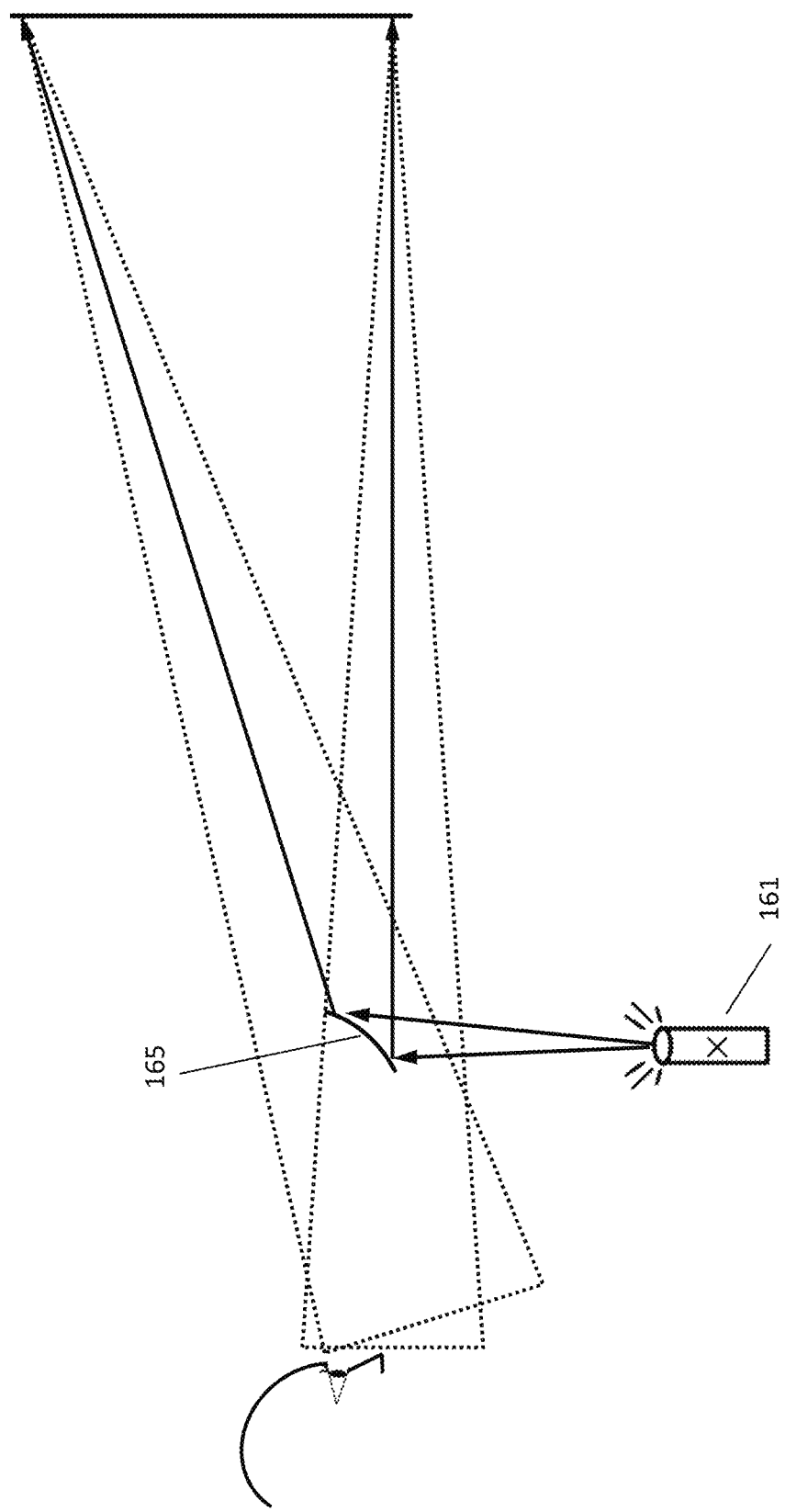
FIG. 16 shows a schematic view of a side view for a viewer with a high throw projector combined with a curved reflecting optical element that enables a further increase distance between projector and the viewer.

FIG. 16 shows a schematic view of a side view for a viewer with a high throw projector 161 combined with a curved reflecting optical element 165 that enables a further increase distance between projector and the viewer. In additional examples, very high throw ratio projectors with throw ratios of greater than about 2, 4, 6, 8 or 10 may be used such that the beams are almost parallel prior to reaching the curved reflecting optical elements, such as a curved mirror. Other configurations with the projector place above or to the sides of the viewer are also possible.

FIG. 17 provides an alternate schematic view that illustrates projector-to-viewer distances without the proposed method (left) versus with the proposed method (right) using the reflecting optical element 155. Again we see that with the proposed configuration, the allowable distance between the projector and the user can be significantly increased (right) relative to a configuration without the proposed method (left).

Figure 18:
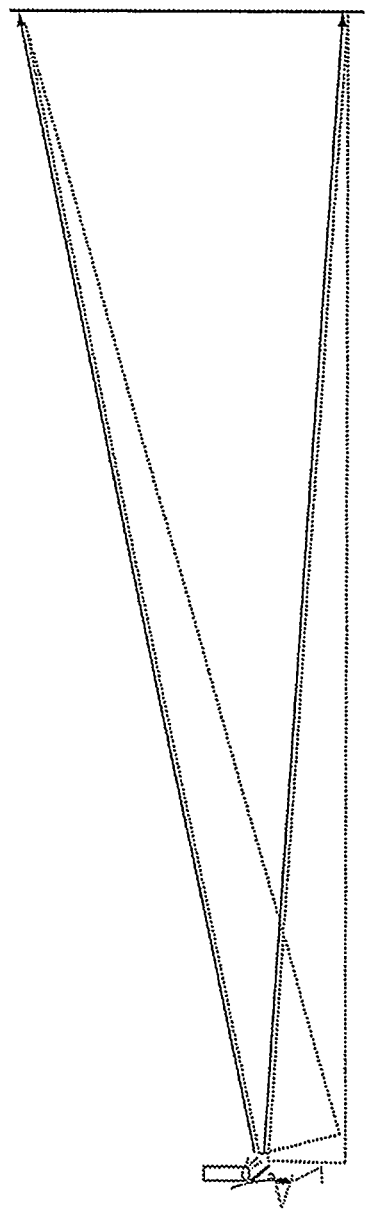
FIG. 18 shows how the approach may be used for head mount systems utilizing smaller projectors.

FIG. 18 shows how the approach may be used for head mount systems utilizing smaller projectors. Because of the optical paths required, many projectors have a larger dimension in the direction of the projected path. In this case the ability to rotate the projector allows a viable head mounted geometry.

Computer Systems

Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 19:
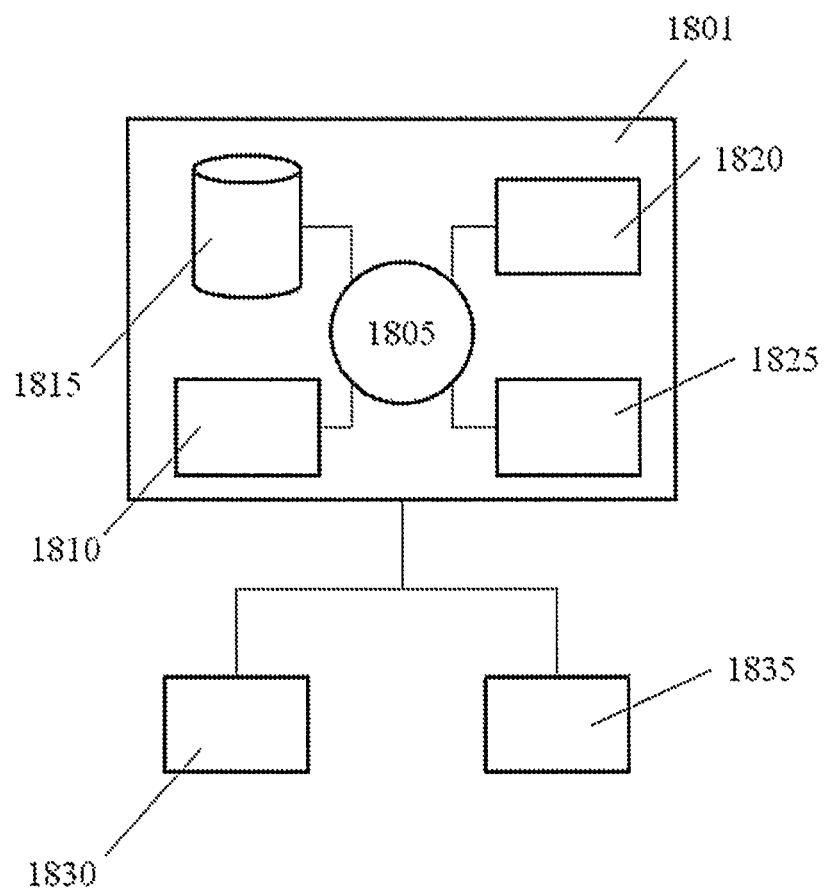
FIG. 19 schematically illustrates a computer system programmed or otherwise configured to facilitate methods of the present disclosure.

FIG. 19 shows a system 1800 comprising a computer server ("server") 1801 that is programmed to implement methods disclosed herein. The server 1801 includes a central processing unit (CPU, also "processor" and "computer processor" herein) 1805, which can be a single core or multi core processor, or a plurality of processors for parallel processing. The server 1801 also includes memory 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The server 1801 can be operatively coupled to a computer network ("network") with the aid of the communication interface 1820. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 1801, can implement a peer-to-peer network, which may enable devices coupled to the server 1801 to behave as a client or a server.

The storage unit 1815 can store files or data. The server 1801 can include one or more additional data storage units that are external to the server 1801, such as located on a remote server that is in communication with the server 1801 through an intranet or the Internet.

In some situations, the system 1800 includes a single server 1801. In other situations, the system 1800 includes multiple servers in communication with one another through an intranet and/or the Internet.

The server 1801 can be adapted to store user information and data of or related to a projection environment, such as, for example, display angles and intensity settings. The server 1801 can be programmed to display an image or video through a projector coupled to the server 1801.

Methods as described herein can be implemented by way of machine (or computer processor) executable code (or software) stored on an electronic storage location of the server 1801, such as, for example, on the memory 1810 or electronic storage unit 1815. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processer adapted to execute the code, or can be compiled during runtime. The code can be supplied in a programming language that can be selected to enable the code to execute in a pre-compiled or as-compiled fashion.

The server 1801 is coupled to (e.g., in communication with) a projector 1830 and a photo detector 1835. In an example, the projector 1830 can project an image or video onto a retro-reflective screen. In another example, the project 1830 can project ultraviolet or infrared light onto the retro-reflective screen. The photo detector 1835 can detect (or measure) reflected light from the retro-reflective screen.

The projector 1830 can include one or more optics for directing and/or focusing an image or video onto the retro-reflective screen. The photo detector can be a device that is configured to generate an electrical current upon exposure to light, such as, for example, a charge-coupled device (CCD).

Aspects of the systems and methods provided herein, such as the server 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 1805. The algorithm can, for example, determine optimum offsets for retro-reflective screen elements.

Systems and methods provided herein may be combined with or modified by other systems and methods, such as those described in, for example, U.S. Patent Publication No. 2013/0342813; PCT Application Nos. PCT/US15/32757 and PCT/US15/57625; U.S. Pat. Nos. 3,817,596, 4,775,219, 5,763,049, 7,261,424, and 7,370,981; and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A display system, comprising:
a retro-reflective screen configured to reflect incident light along a direction that is opposite to the direction of propagation of said incident light;
a projector for projecting light characterizing an image or video to said retro-reflective screen; and
an array of optical elements, wherein said array of optical elements comprise a plurality of individual optical elements each disposed at a substantially constant separation distance from a major surface of said retro-reflective screen, wherein each of said plurality of individual optical elements has a side extending away from the major surface in a direction forming an angle of less than about 45 degrees with respect to a surface normal of said retro-reflective screen, wherein each of said plurality of individual optical elements directs said light from said projector to said retro-reflective screen in a manner such that said image or video is viewable by a user at an observation angle of at least about 4 degrees, and wherein each of the plurality of individual optical elements has a size that is the same or smaller than a pixel size of the retro-reflective screen.

2. The display system of claim 1, wherein at least one optical element of said array of optical elements is a beam splitter.

3. The display system of claim 1, wherein each optical element of said array of optical elements is a beam splitter.

4. The display system of claim 1, wherein at least one optical element of said array of optical elements is a prismatic element.

5. The display system of claim 1, wherein each optical element of said array of optical elements is a prismatic element.

6. The display system of claim 1, wherein each optical element of said array of optical elements splits a beam of said light provided from the projector.

7. The display system of claim 1, wherein each of said plurality of individual optical elements directs said light from said projector to said retro-reflective screen in a manner such that said image or video is viewable by said user at an observation angle of at least about 10 degrees.

8. The display system of claim 1, wherein each of said plurality of individual optical elements directs said light from said projector to said retro-reflective screen in a manner such that said image or video is viewable by said user at an observation angle of at least about 20 degrees.

9. The display system of claim 1, wherein each of said plurality of individual optical elements directs said light from said projector to said retro-reflective screen to provide an observation angle of up to 60 degrees.

10. The display system of claim 1, wherein each of the plurality of individual optical elements contacts the retro-reflective screen.

11. A method for displaying an image or video to a user, comprising:
activating a system, the system comprising:
a retro-reflective screen configured to reflect incident light along a direction that is opposite to the direction of propagation of said incident light,
a projector for projecting light characterizing an image or video to said retro-reflective screen, and
an array of optical elements; wherein said array of optical elements comprise a plurality of individual optical elements each disposed at a substantially constant separation distance from a major surface of said retro-reflective screen, wherein each of said plurality of individual optical elements has a side extending away from the major surface in a direction forming an angle of less than about 45 degrees with respect to a surface normal of said retro-reflective screen, and wherein each of the plurality of individual optical elements has a size that is the same or smaller than a pixel size of the retro-reflective screen; and
directing said light from said projector to said array of optical elements comprising said plurality of individual optical elements, wherein each of said plurality of individual optical elements directs said light from said projector to said retro-reflective screen in a manner such that, upon reflection from said retro-reflective screen, said light characterizing said image or video is viewed by said user at an observation angle of at least about 4 degrees.

12. The method of claim 11, wherein at least one optical element of said array of optical elements is a beam splitter.

13. The method of claim 11, wherein at least one optical element of said array of optical elements is a prismatic element.

14. The method of claim 11, wherein each optical element of said array of optical elements splits a beam of said light provided from the projector.

15. The method of claim 11, wherein each of said plurality of individual optical elements directs said light from said projector to said retro-reflective screen in a manner such that said image or video is viewed by said user at an observation angle of at least about 10 degrees.

* * * * *

UNITED STATES PATENT AND TRADEMARK OFFICE
CERTIFICATE OF CORRECTION

PATENT NO. : 10,921,611 B2
APPLICATION NO. : 15/979388
DATED : February 16, 2021
INVENTOR(S) : Michael W. Wang Page 1 of 1

It is certified that error appears in the above-identified patent and that said Letters Patent is hereby corrected as shown below:

In the Specification

In Column 8, Line 57, delete "2×" and insert --~2×--.

In Column 11, Line 8, delete "a" and insert --α--.

In Column 13, Line 48, delete "processer" and insert --processor--.

In the Claims

In Column 16, Line 28 (Approx.), Claim 11, delete "elements;" and insert --elements,--.

Signed and Sealed this
Fourth Day of May, 2021

Drew Hirshfeld
*Performing the Functions and Duties of the
Under Secretary of Commerce for Intellectual Property and
Director of the United States Patent and Trademark Office*